United States Patent Office 3,186,459
Patented June 1, 1965

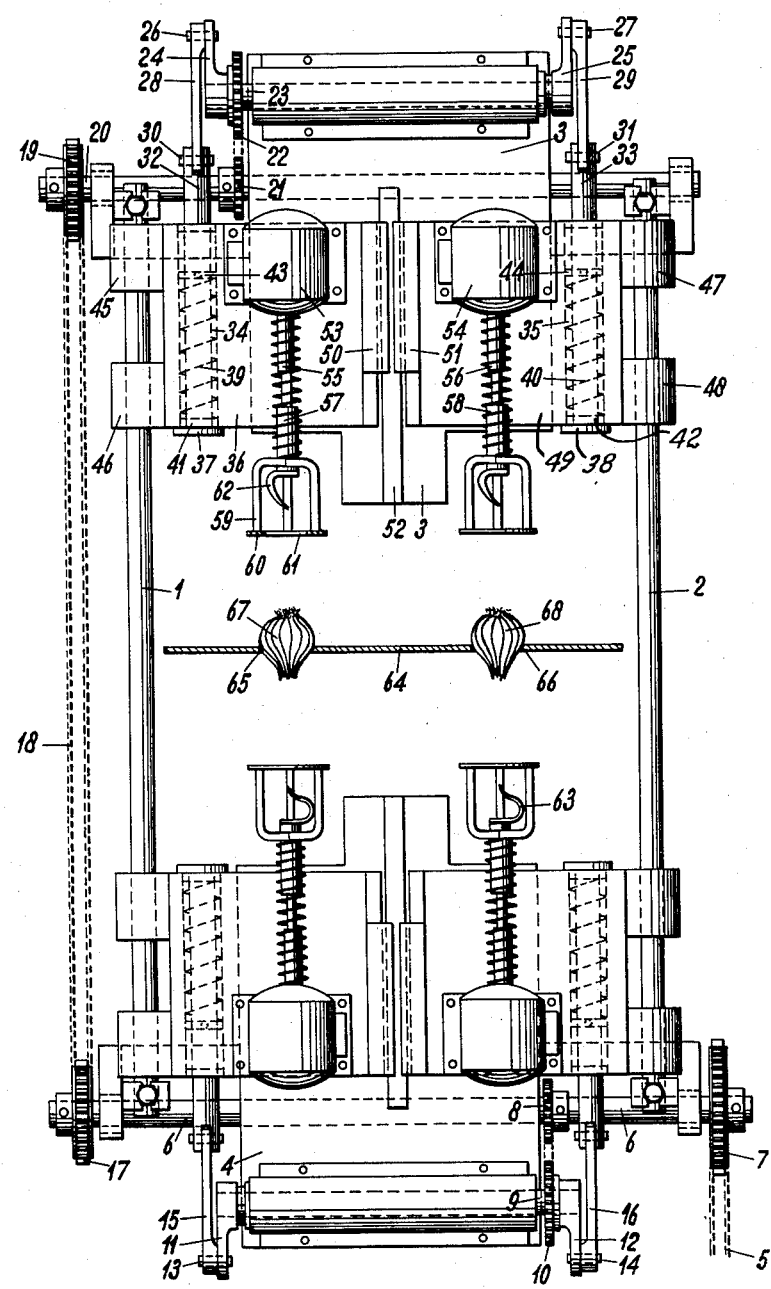

3,186,459
ONION END TRIMMER
Albertus van Raay, Ulft, Netherlands, assignor to N.V. Machinefabriek "FINIS," Ulft, Netherlands, a limited-liability company
Filed Nov. 12, 1963, Ser. No. 322,884
Claims priority, application Netherlands, Nov. 9, 1962, 285,343
3 Claims. (Cl. 146—83)

The invention relates to a device for decapitating and tailing plants, especially onions.

Devices have already been devised in which e.g. onions are placed on a conveyor belt and an apparatus containing a revolving knife is pressed onto the onion by hand, by which the onion is decapitated and, after having been turned upside down, is tailed. Apart from the fact that this manipulation takes up much time, it may be dangerous for the attendants whilst, moreover, either too much or too little of the plant is removed.

Also devices are known in which part of the plant, i.e. the onion, is always cut off at a pre-determined height above the carrier. The disadvantage that from big onions too much and from small onions too little is cut off is here still more striking, even if a pre-sizing of the onions has taken place.

The invention removes these disadvantages and typically constitutes a device such as an onion trimmer in which the attendants only need to place the onions upon the conveyor belt by which it is possible to work with a velocity hitherto deemed impossible, i.e. of 60–120 a minute whilst moreover, the device adjusts itself automatically to the shape and size of the onions, so that always the same part is decapitated or tailed.

The invention relates to a device for decapitating and tailing plants, especially onions, said device comprising a conveyor belt for the supply of the plants, which conveyor belt makes, during the action, an intermittent movement and stops during the treatment proper and is characterized in that a pair of trimming assemblies are positioned, one above and one below the belt, one being a decapitating assembly and one a tailing assembly whilst in each trimming assembly a resiliently driven cutting means is positioned at that side of a punched foot-plate which is turned away from the conveyor belt, which foot-plates at the approach of the assemblies to the conveyor belt will come to rest on the onion there present at that moment in such a way, that the height of cutting is adjusted by the onion itself and the driving of the assemblies takes place always at the same height.

The movement of the decapitating and tailing assemblies may take place in a great number of ways. Preferably each assembly contains a frame which can be resiliently moved upwards and downwards by means of an eccentric movement known in itself.

Preferably the cutting assembly can resiliently be driven by an electric motor positioned in the frame of the assembly.

Further characteristics and details will be elucidated in the following description.

The invention is elucidated by a drawing comprising front view and part of a cross-section of an embodiment of a device for decapitating and tailing onions with a double cutting apparatus.

The device shown in the drawing comprises a frame consisting of two guide rods 1 and 2, an upper support 3 for driving the decapitating assemblies and a lower support 4 for driving the tailing assemblies. The driving of the complete device including both trimming assemblies is effected by means of a (not shown) source of energy, i.e. an electric motor or the like via a driving chain 5 and a main toothed wheel 7 on a lower main shaft 6.

The lower man shaft 6 is positioned in the frame and drives, via the toothed wheel 8 mounted on the frame, a shaft 9 positioned in the lower support 4 via the toothed wheel 10. By means of two crank mechanisms 11 and 12 and appertaining crank pins 13 and 14 arranged at the ends of the shaft 9, the driving rods 15 and 16 are moved upwards and downwards when the device is in action.

At the end of the lower main shaft 6 facing the main toothed wheel 7 a transmitting toothed wheel 17 is positioned over which a transmitting chain 18 runs to the second main toothed wheel 19. This second main toothed wheel 19 is mounted on the upper main shaft 20, on which, analogous to the driving of the lower part already described a toothed wheel 21 is mounted which drives the shaft 23 via a toothed wheel 22 arranged on the said shaft 23 in the upper support 3. Also on this shaft 23 crank mechanisms 24 and 25 are arranged at either side which, via the crank pins 26 and 27 moves the driving rods 28 and 29 upwards and downwards when the device is in action.

The lower support and the upper support of the device being almost entirely symmetrical and working symmetrically and synchronously a description of the upper part, i.e. of the decapitating assembly will suffice.

In the shown embodiment the decapitating assemblies are hanging from both driving rods 28 and 29 via pins 30 and 31 and rods 32 and 33. The lower parts of these rods run through perforations 34 and 35 in the frame of the decapitating assembly. Flanges 37 and 38 at the lower ends of the rods 32 and 33 restrict the movement of the rods 32 and 33 in the frames 36 and 49. Between the lower ends of the rods 32 and 33 and the walls of the perforations 34 and 35 helical springs 39 and 40 are situated, which rest at 41 and 42 upon lower spring plates 41 and 42 of the frames 36 and 49, and at 43 and 44 against upper spring plates of the rods 32 and 33. At the upward and downward movement of the rods 32 and 33 the frames 36 and 49 are, therefore, taken along resiliently.

The frame 36 of the one decapitating assembly is guided in its movement on the one side over the guiding rod 1 by sliding pieces 45 and 46, the frame 49 of the other decapitating assembly along the guiding rod 2 by sliding pieces 47 and 48. By means of sliding rods 50 and 51 the frames 36 and 49 are guided unto the middle of a guiding path 52, said guiding path being arranged in the upper support 3.

On either frame 36 and 49 an electric motor 53 and 54 respectively has been mounted. The driving shafts 55 and 56 are resiliently connected with the shafts 57 and 58 of the cutting apparatus. This cutting apparatus consists in a cage 59 with an annular foot-plate 60, the latter having an upwards tapering conical aperture 61. The knife 62 mounted on the shaft 57 is of a shape suitable for the decapitation which is somewhat different from that of the knife 63 serving for the tailing.

The conveyor belt 64 runs in a direction perpendicular to the plane of the drawing, which conveyor belt is provided with apertures 65 and 66 in which the onions 67 and 68 are placed by the attendants. This conveyor belt 64 runs intermittently and synchronous with the movement of the decapitating and tailing assemblies in such a way that when the decapitating assembly rises and, consequently, the tailing assembly descends, the conveyor belt proceeds until the onions 67 and 68 are precisely under and above the cutting assemblies in a trimming position, whereupon the conveyor belt 64 stops and the decapitating and tailing assemblies start their movement towards the conveyor belt 64. As soon as the foot-plate 60 rests upon the onion 67 and the knife 62 starts to decapitate at a height determined by the position reached at this moment by the foot-plate 60, the springs come into action so that the forced, equally spaced movements of the driving rods 28 and 29 can effect the cutting off at varying heights (varying as to the size of the onions) by means of the action of the springs and therefore, the degree of decapitating and tailing is always the same.

It must be observed that the device is especially suited for big and medium onions and that, furthermore, it works efficaciously for onions of different shapes and sizes because the foot-plates come to rest with either side of the onions at the cutting action of the knives rotating uninterruptedly.

It will be clear that a great number of variations are possible in the guidance of the frame as well as in the resilient driving, whilst it is possible to work with one double assembly (one assembly for decapitating and one for tailing) but also with two double assemblies (as shown).

A great number of variations are possible which, however, are all covered by the present invention.

What I claim is:

1. An onion trimmer, including in combination:
an intermittently moved horizontal conveyor having a series of longitudinally spaced onion-receiving apertures therethrough in which onions may be placed vertically, with one part to be trimmed lying above the conveyor and another part to be trimmed lying below the conveyor, said conveyor stopping during the trimming with at least one aperture then in a predetermined trimming position,
a pair of trimming assembly frames mounted for reciprocating vertical movement, one above and one below said conveyor,
moving means for simultaneously moving both said frames toward said conveyor when said conveyor is stopped in said trimming position and for retracting said frames therefrom after the trimming,
a cage resiliently supported by each said assembly through spring means and each having an annular foot-plate for bearing gently against the body of a stationary onion to be trimmed, said spring thereupon yielding to further movement of said frame toward said conveyor, and
a pair of cutting means comprising driving means mounted on each said frame for movement therewith and a rotating blade mounted for movement with said cage and spaced a constant distance from said foot-plate and driven by said driving means,
whereby when said conveyor is stopped with an onion in trimming position, two foot-plates come gently against the opposite ends of said onion and hold it while said blades trim said onion, the points of trimming thereby being determined by each onion regardless of its size at a set distance from the area where said foot-plates engage their body, and whereby the trimming is achieved without scraping or rubbing the body of said onion.

2. The trimmer of claim 1 wherein said moving means resiliently drives said frames in their reciprocating movement through yielding connections therewith.

3. The trimmer of claim 1, wherein said driving means for each said cutting means comprises an electric motor with a drive shaft, a driven shaft secured to said blade and operatively connected to said drive shaft for rotation therewith while free to move longitudinally with respect thereto, and said spring means being a helical spring around said shafts and bearing against said motor at one end and said cage at the other end.

References Cited by the Examiner

UNITED STATES PATENTS 3,062,250   11/62   Kressin _____ 146—83

FOREIGN PATENTS 650,653   2/51   Great Britain.

J. SPENCER OVERHOLSER, *Primary Examiner.*